(12) United States Patent
Eckhardt et al.

(10) Patent No.: US 10,005,220 B2
(45) Date of Patent: Jun. 26, 2018

(54) ANNULAR DIE AND METHOD FOR EXTRUSION

(71) Applicant: Kautex Textron GmbH & Co. KG, Bonn (DE)

(72) Inventors: Joachim Eckhardt, Bonn (DE); Thomas Froitzheim, Sankt Augustin (DE); David Schenkel, Bonn (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 777 days.

(21) Appl. No.: 14/383,361

(22) PCT Filed: Feb. 16, 2013

(86) PCT No.: PCT/EP2013/000464
§ 371 (c)(1),
(2) Date: Sep. 5, 2014

(87) PCT Pub. No.: WO2013/131612
PCT Pub. Date: Sep. 12, 2013

(65) Prior Publication Data
US 2015/0021811 A1    Jan. 22, 2015

(30) Foreign Application Priority Data

Mar. 5, 2012   (DE) .................. 10 2012 004 166

(51) Int. Cl.
*B29C 47/30*   (2006.01)
*B29C 47/12*   (2006.01)
(Continued)

(52) U.S. Cl.
CPC ........ *B29C 47/124* (2013.01); *B29C 47/0023* (2013.01); *B29C 47/225* (2013.01);
(Continued)

(58) Field of Classification Search
CPC . B29C 47/124; B29C 47/0023; B29C 47/225; B29C 47/0026; B29C 47/003;
(Continued)

(56) References Cited

U.S. PATENT DOCUMENTS

| 4,432,718 A | 2/1984 | Wurzer |
| 5,057,267 A | 10/1991 | Seizert et al. |
| 6,024,557 A | 2/2000 | Feuerherm |

FOREIGN PATENT DOCUMENTS

| CN | 101518944 A | 9/2009 |
| CN | 101612786 A | 12/2009 |

(Continued)

OTHER PUBLICATIONS

English language PCT International Search Report dated Apr. 17, 2013, received in corresponding PCT Application No. PCT/EP13/00464, 3 pgs.

(Continued)

*Primary Examiner* — Christina Johnson
*Assistant Examiner* — Xue Liu
(74) *Attorney, Agent, or Firm* — Grossman, Tucker, Perreault & Pfleger, PLLC

(57) ABSTRACT

The invention relates to an annular die (1) on an extrusion head for producing tubular or sheet-like preforms with an arcuate die gap and with a melt channel (4) delimited by a mandrel (2) and a die body (3), the cross-sectional profile of the melt channel (4) being variable by way of adjusting elements, the annular die according to the invention being distinguished by the fact that the outer circumference of the melt channel (4) is at least partially delimited directly by at least one radially adjustable slide (5), that the slide (5) is formed by a number of segments that can be adjusted together from at least one first position into at least one second position, and that the segments in each position form (Continued)

Figure 1:
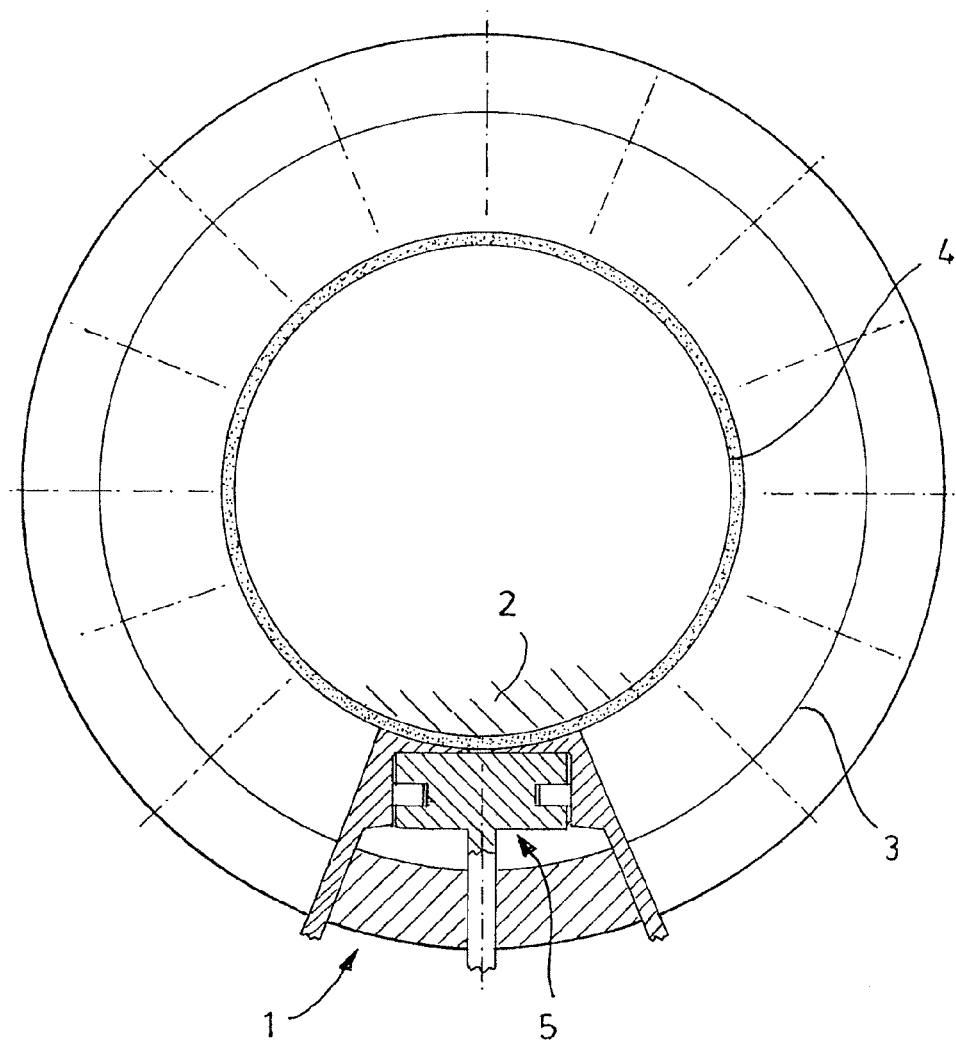

a respectively closed arc portion of the delimitation of the melt channel (4), the radius of the arc portion being different according to the position of the segments.

14 Claims, 6 Drawing Sheets

(51) Int. Cl.
  *B29C 47/00* (2006.01)
  *B29C 47/22* (2006.01)
  *B29C 49/04* (2006.01)
  *B29C 49/02* (2006.01)
  *B29K 101/12* (2006.01)

(52) U.S. Cl.
  CPC ........ *B29C 47/003* (2013.01); *B29C 47/0026* (2013.01); *B29C 47/0033* (2013.01); *B29C 47/30* (2013.01); *B29C 49/04* (2013.01); *B29C 2049/023* (2013.01); *B29C 2049/048* (2013.01); *B29C 2947/92619* (2013.01); *B29C 2947/92647* (2013.01); *B29C 2947/92904* (2013.01); *B29K 2101/12* (2013.01)

(58) Field of Classification Search
  CPC ................ B29C 47/0033; B29C 47/30; B29C 2947/92619; B29C 2947/92647; B29C 2947/92904
  USPC ......................................................... 425/466
  See application file for complete search history.

(56) References Cited

FOREIGN PATENT DOCUMENTS

| | | |
|---|---|---|
| DE | 1504440 A1 | 2/1970 |
| DE | 2823999 C2 | 6/1984 |
| DE | 19929381 A1 | 1/2001 |
| DE | 10355818 A1 | 6/2005 |
| EP | 0945245 A1 | 9/1999 |
| JP | S63160807 A | 7/1988 |

OTHER PUBLICATIONS

English language PCT Written Opinion dated Apr. 17, 2013, received in corresponding PCT Application No. PCT/EP13/00464, 6 pgs.

Fig. 5
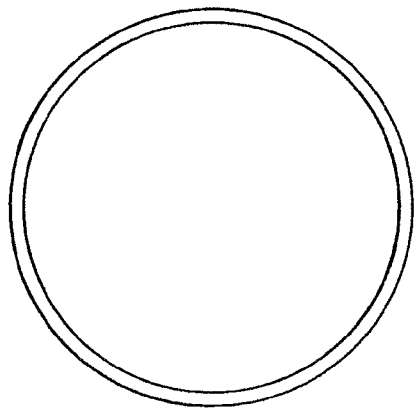
Fig. 6
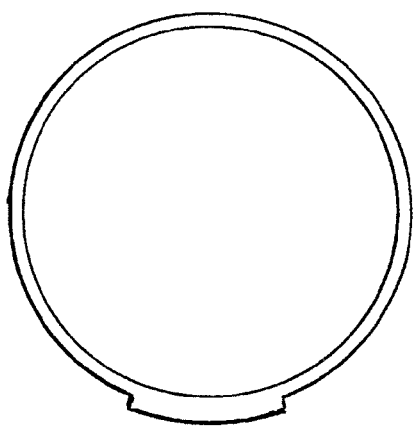
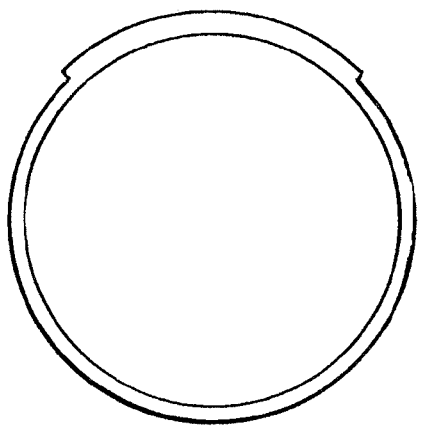
Fig. 7
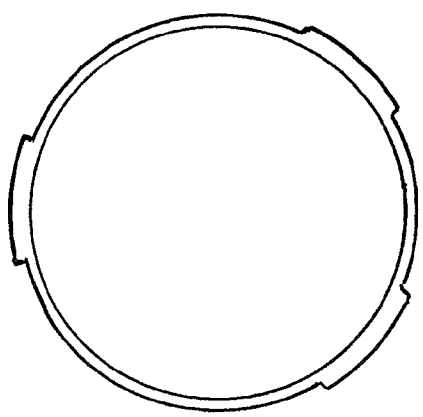
Fig. 8

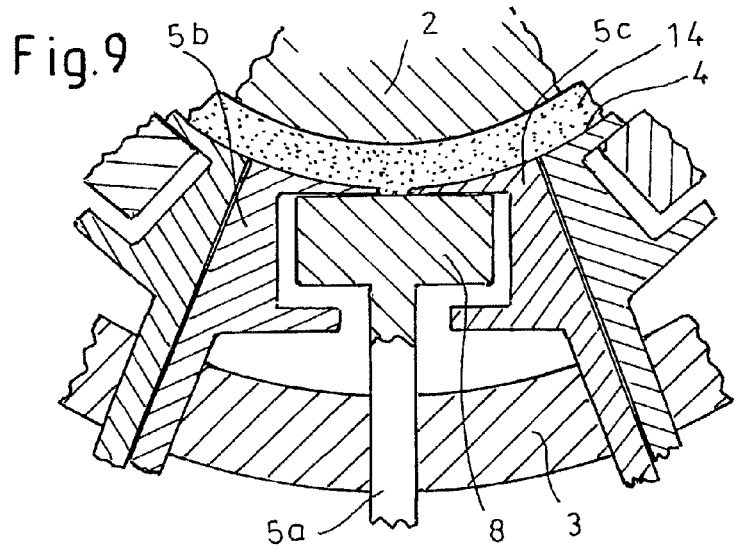
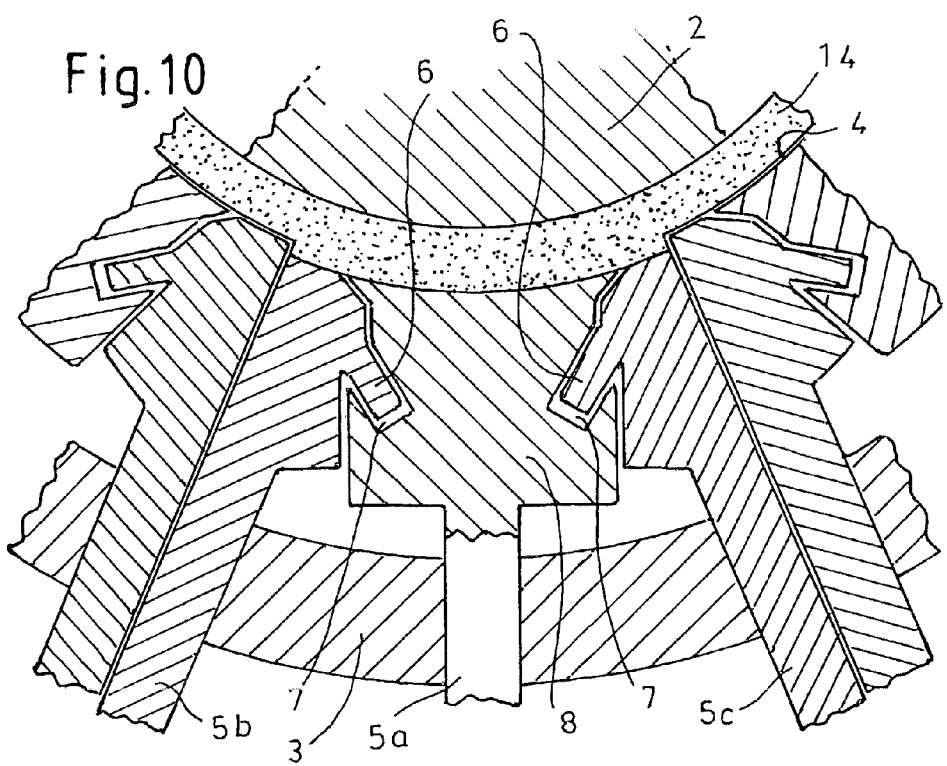

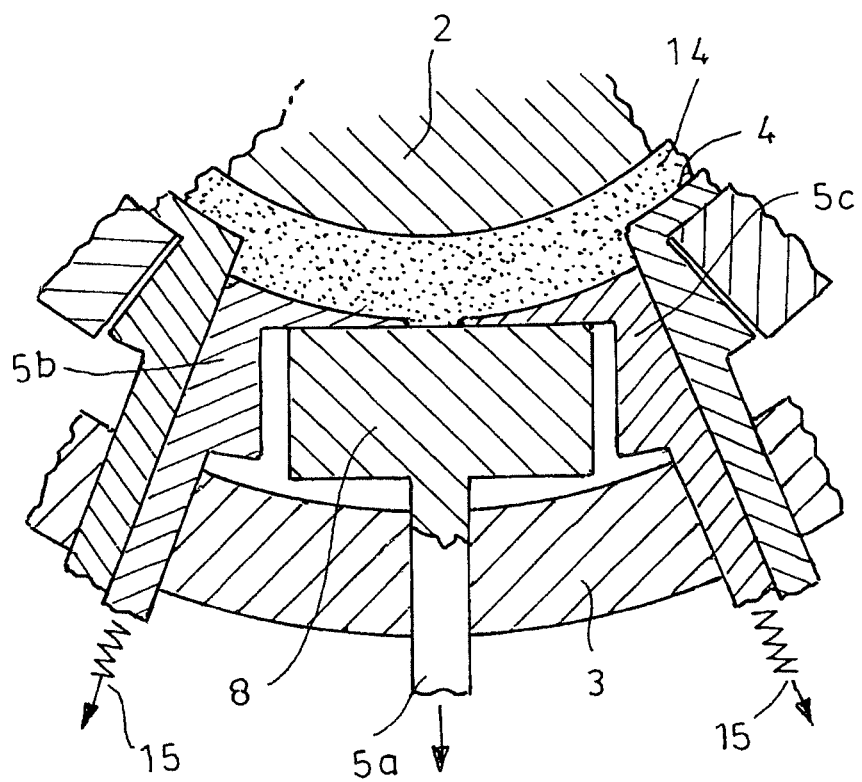

ANNULAR DIE AND METHOD FOR EXTRUSION

The invention relates to an annular die on an extrusion head for producing tubular or sheet-like preforms, with an arcuate die gap and with a melt channel delimited by a mandrel and a die body, the cross-sectional profile of the melt channel being variable by way of adjusting elements.

The invention also relates to a method for the extrusion of a tubular or sheet-like preform from plasticated thermoplastic material by means of an annular die with an arcuate die gap and with a melt channel delimited by a mandrel and a die body, the method comprising varying the profile of the melt channel during the extrusion and/or while setting the annular die.

Both annular dies and methods for extruding tubular preforms of the type described above are known from various prior-art publications. For example, a device and a method are known from DE 199 29 381 D2, the latter document being concerned in particular with the setting of an annular die for producing tubular performs, which are made to expand in a blow mold to form plastic containers. A setting is in any case always required whenever hollow bodies with different cross sections, different weights, etc. are produced. In other words, the setting is generally a one-off process that is performed product-specifically.

To be differentiated from this is the wall thickness control during the extrusion. This wall thickness control over the length and circumference of the tubular or sheet-like extrudate is likewise known in principle in the prior art. Here a distinction is drawn between axial wall thickness control (known as WDS) and radial wall thickness control (known as PWDS). In the case of axial wall thickness control, the thickness of the extrudate is varied over the entire length in the direction of extrusion, the wall thickness being varied over the entire circumference of the extrudate. In the case of radial wall thickness control, a circumferentially based wall thickness profile can be produced over the entire length of the extrudate or over part of the length of the extrudate. This may be performed on the one hand by centering and decentering the mandrel with respect to the die body or the die body with respect to the mandrel, on the other hand this may be accomplished by additionally feeding material into the melt channel of the extrusion head.

In the case of a method described in DE 28 23 999 C2, it is envisaged to vary the gap width of the die gap during the discharge of the tubular parison by program-controlled axial adjusting movement of the mandrel and the die body.

In the case of the extrusion head according to DE 199 29 381 C2, an elastically deformable sleeve in the form of a thin-walled metal part is provided within the extrusion head or within the die and is deformed when setting the annular die by means of adjusting elements, so that a specific melt channel profile is produced in this way. Thus, the distribution of the material on the finished extrudate can be adapted relatively exactly to the requirements of the product to be produced, in particular the desired wall thickness distribution on the product.

All known methods in which it is not envisaged to feed in further melt streams in the region of the die gap (soling) have the disadvantage that varying the cross-sectional profile of the melt channel over part of the circumference is to the detriment or benefit of the width of the melt channel at another point of the circumference. With respect to the example of the deformable sleeve, this means that a constriction of the melt channel at one point of the circumference inevitably involves a widening of the melt channel at another point of the circumference, and vice versa.

As a result, there are in principle limits to the setting of the cross-sectional profile of the melt channel.

The invention is therefore based on the object of improving an annular die of the type referred to above and of providing a method that does not have the aforementioned disadvantages.

The object on which the invention is based is achieved by an annular die on an extrusion head for producing tubular or sheet-like preforms with an arcuate die gap and with a melt channel delimited by a mandrel and a die body, the cross-sectional profile of the melt channel being variable by way of adjusting elements, the annular die being distinguished by the fact that the circumference of the melt channel is at least partially delimited directly by at least one radially adjustable slide, that the slide is formed by a number of segments that can be adjusted together from at least one first position into at least one second position, and that the segments in each position form a respectively closed arc portion of the delimitation of the melt channel, the radius of the arc portion being different according to the position of the segments.

The slide or slides can delimit the outer circumference of the melt channel or alternatively the inner circumference of the melt channel. In the case of the latter variant, slides may for example be provided on the outer circumference or at the outer circumference of the mandrel. The mandrel may be formed as it were as a stretching mandrel.

In particular because of the fact that, depending on the position of the slide, the segments of the slide that at least partially delimit the melt channel respectively form a closed arc portion with a differing radius according to the position of the slide, varying of the cross-sectional profile of the melt channel over the entire circumference of the melt channel or over parts of its circumference is possible, on the one hand without an adjustment in one region of the arc portion being to the detriment or benefit of the width of the melt channel in another portion of the circumference and on the other hand without having to open or interrupt the circumference of the melt channel. As a result, it is possible in particular to form the annular die in such a way that a number of slides delimit the circumference of the melt channel. At best, a multiplicity of slides may be arranged completely over the entire circumference of the melt channel in such a way that each slide is respectively adjacent a neighboring slide on both sides. This makes it possible to increase the circumference of the melt channel substantially without interstices forming between the segments.

For the purposes of the invention, substantially without interstices forming means that the circumference of the melt channel concerned is formed almost jointlessly, or that a continuous, jointless juxtaposition of all the segments delimiting the melt channel is provided. For the purposes of the invention, jointless may mean for example that the joint has a clear width of ≤3/10 mm, so that melt can only penetrate into the joints to the least possible extent, if at all. When the term "jointless" is used above, it should be understood as meaning that joints that are of course present have such a small gap that the delimiting wall concerned can be referred to as almost jointless.

The die gap formed by the melt channel may be formed so as to be circular and running all the way around, but it may form a number of interrupted or spaced-apart circular arc segments, for example in order to extrude from one melt stream two separate, respectively semicircular or arcuate preform sheets. By means of the radially adjustable slides according to the invention, the melt channel can also be completely blocked at certain points, if so desired.

The extrusion head according to the invention may be formed both for the continuous extrusion and for the discontinuous extrusion of one or more melt streams from one or more extruders. It may be formed as a radially gating head or as an axially gating head, as it is known.

The extrusion head may be designed such that the cross-sectional profile of the melt channel can be set dynamically during the extrusion, i.e. on the basis of a predetermined program, or alternatively it may be envisaged to adjust the melt channel statically, i.e. for the purpose of setting the annular die.

The slide or slides may be adjustable by means of spindle drives, pneumatic, hydraulic or other electrical or mechanical drives.

In the case of an expedient variant of the annular die according to the invention, the entire cross-sectional profile of the melt channel is delimited in the region of the die gap of the annular die by way of radially adjustable slides, a multiplicity of slides that completely define the outer circumference of the melt channel over an angle of 360° being arranged next to one another over the entire circumference.

In the case of an expedient and advantageous variant of the annular die according to the invention, it is provided that the individual segments of a slide are kinematically positively coupled.

The slide expediently comprises a main slide segment and two secondary slide segments, which together form a circular arc segment delimiting the melt channel. In an advantageous way, the secondary slide segments are respectively coupled to the main slide segment by way of a slotted-link guide.

Such a slotted-link guide is not necessarily required; rather, it may also be provided that the secondary slide segments are guided on a die body of the annular die.

It is particularly advantageous if a guidance of the secondary slide segments on the main slide segment is provided at an angle to the adjusting direction of the main slide segment. The secondary slide segments may for example be guided perpendicularly to the adjusting direction of the main slide segment, but there are other conceivable guiding angles, which allow a radial adjusting movement of the main slide segment and a concurrent transverse adjusting movement of the secondary slide segments. The secondary side segments respectively comprise an approximately wedge-shaped main body, which fills the interstices between two neighboring slides on both sides of the main slide. It is expedient furthermore if the secondary slide segments are respectively provided with approximately arcuate end sides that are concave with respect to the melt channel and define part of the arcuate end face of the slide.

In the case of an advantageous variant of the annular die according to the invention, it is provided that the secondary slide segments are guided in such a way that a radial adjustment of the main slide segment with respect to the circumference of the melt channel brings about a radial adjusting movement and a concurrent transverse adjusting movement of the secondary slide segments.

For the basic gap adjustment of the melt channel, it may additionally be provided that the mandrel of the annular die is axially adjustable.

Furthermore, it may optionally be provided that the die body and/or the mandrel are adjustable in such a way that the melt channel is asymmetrically adjustable.

Expediently, the profile of the melt channel is completely dynamically adjustable during the extrusion.

The object on which the invention is based is also achieved by a method for the extrusion of a tubular or sheet-like preform from plasticated thermoplastic material by means of an annular die with an arcuate die gap and with a melt channel delimited by a mandrel and a die body, the method comprising varying the profile of the melt channel during the extrusion and/or while setting the annular die, and the method being distinguished by the fact that an adjustment of the width of one or more portions of the circumference of the melt channel is carried out without influencing the width of the remaining portion or portions of the circumference.

In the case of a preferred variant of the method according to the invention, it is provided that the adjustment is carried out by means of a number of slide segments, which delimit the circumference of the melt channel and, while maintaining a closed arc contour, allow the setting of differing radii for one or more portions of the circumference of the melt channel.

A preferred variant of the method is distinguished by a fully circumferential adjustment of the melt channel by means of the slide segments in the sense of a diameter adjustment for the purpose of adaptation to different preform diameters. In this way, a setting to different nominal widths can be performed with the annular die according to the invention without requiring for example the modification of an extrusion blow-molding machine concerned. Thus, an adaptation of the annular die to different products can be performed without modifying the annular die or exchanging it.

Such a fully circumferential adjustment may be performed for example without profiling of the melt channel.

A basic gap adjustment of the melt channel is expediently provided in addition to the slide adjustment. The basic gap adjustment of the melt channel may also be performed both statically and dynamically.

Figure 2:
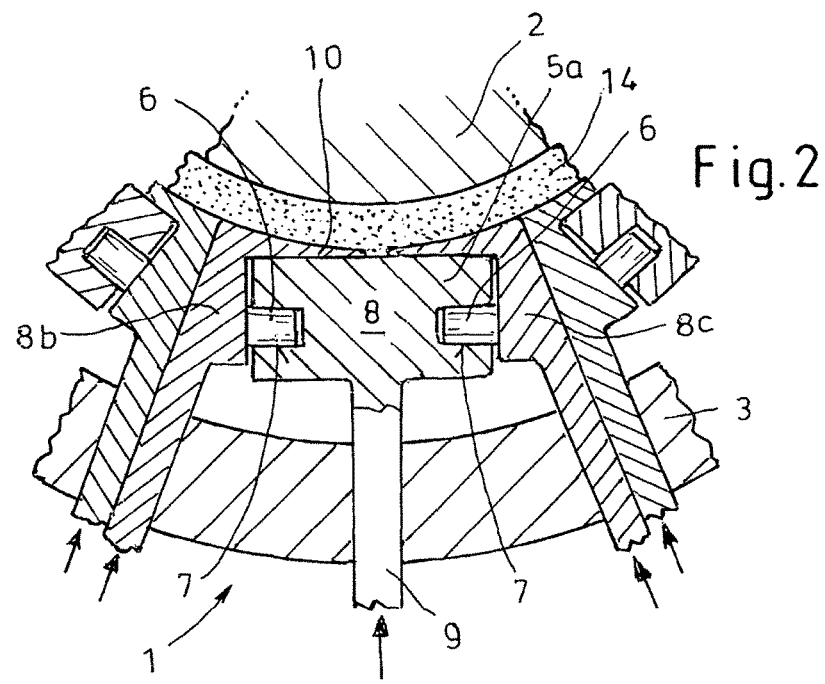
Figure 3:
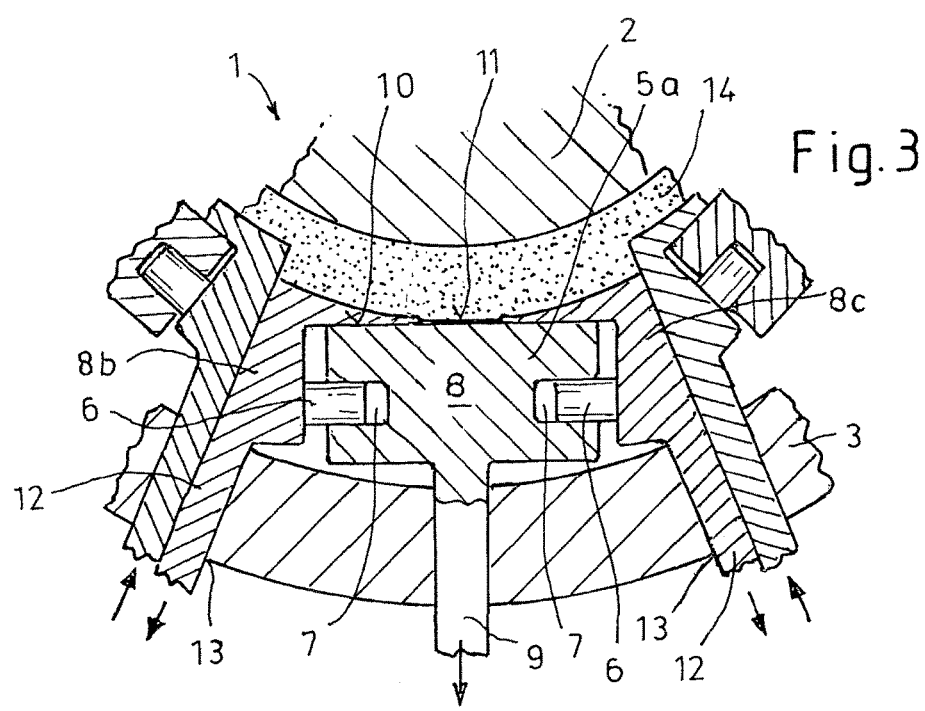

The invention is explained below on the basis of an exemplary embodiment that is represented in the drawings, in which:

FIG. 1 shows a cross section through an annular die of an extrusion head according to the invention in the region of the die gap, FIG. 2 shows an enlarged view from FIG. 1, which shows in cross section a slide delimiting the melt channel, the slide being represented in a first position, FIG. 3 shows a view corresponding to FIG. 2, the slide being represented in a second position, FIG. 3 shows a view substantially corresponding to FIGS. 2 and 3, the position of a number of slides next to one another being represented, FIGS. 5 to 8 show various sectional views of differently designed cross-sectional profiles of the melt channel, FIG. 9 shows a sectional view of an annular die according to the invention as provided by a second exemplary embodiment, FIG. 10 shows a sectional view of the annular die as provided by a third exemplary embodiment according to the invention and FIG. 11 shows a sectional view of the annular die as provided by a fourth exemplary embodiment of the invention.

The annular die 1 according to the invention serves for the extrusion of tubular, plastic molten-hot preforms from thermoplastic material, which after being discharged from the annular die are re-shaped or molded in a blow mold while in the still plastic and molten-hot state to form a substantially closed hollow body. The re-shaping is generally performed in the first heat of the extrudate, i.e. without expending further plasticating energy. Within the blow mold, one or more preforms are made to expand into the cavity formed by the mold and are brought to bear against the cavity by applying differential pressure. The cavity of the blow mold determines the final shape of the finished article.

The annular die according to the invention comprises a mandrel 2, which in a way known per se is axially displaceable and, between itself and a die body 3 surrounding it, defines a melt channel 4.

At the discharge end of the annular die 1, the die body 3 comprises slides 5, which delimit the melt channel 4 and, in the case of the exemplary embodiment represented, are arranged over the entire circumference of the annular die 1. Each slide 5 forms an arc segment of the outer circumference of the melt channel 4. The slides are respectively arranged directly adjacent one another, only a single slide 5 being represented in FIG. 1 for the sake of simplicity. On the one hand, an all-round provision of slides 5 around the annular die (full complement) is possible, on the other hand slides 5 may be provided only at one point or a small number of points of the circumference of the annular die 1, so that the melt channel 4 is adjustable only in portions.

Each of the slides 5 is radially adjustable with respect to the cross section of the annular die and delimits the melt channel 4 directly, so that an adjustment of the slide 5 concerned brings about a change of the clear width of the melt channel 4 in the arc portion concerned.

It is evident to a person skilled in the art that the number of slides 5 defining the enclosing wall of the melt channel is variable within certain limits.

Each of the slides 5 comprises a main slide segment 5a and two secondary slide segments 5b, 5c, which are kinematically coupled. Both the main slide segment 5a and the secondary slide segments 5b, 5c are radially guided with respect to the circumference of the melt channel 4 in the die body 3, two secondary slide segments 5b, 5c respectively being guided transversely thereto in the main slide segment 5a, i.e., when there is a radial movement of the main slide segment 5a, completing a positively guided extending movement, which is almost tangential to the circumferential direction of the melt channel 4. For this purpose, each secondary slide segment 5b, 5c is provided with a pin 6, which is respectively mounted displaceably in a guiding bore 7 of the main slide segment 5a. Although reference is made here to a pin 6 and guiding bores 7, the kinematic coupling of the slide segments may also be designed differently, for example a slotted-link guide with rectangular guiding profiles or guiding slots may be provided.

Together with the main slide segment 5a, the secondary slide segments 5b, 5c form a slotted-link guide. The main slide segment 5a comprises an approximately rectangular main body 8, in which the guiding bores 7 extend transversely to the intended adjusting movement. The main body 8 of the main slide segment 5a also comprises an actuating member in the form of a ram 9, by way of which the force of an actuating device is introduced for the purpose of adjustment. This ram 9 may for example be formed as a piston rod of a pneumatic or hydraulic adjusting cylinder. Alternatively, the ram 9 may be formed as a threaded rod, which acts together with an adjusting nut of an electromotive spindle drive.

As can be readily seen from FIGS. 2 and 3, a gap or an interstice would occur between two neighboring slides 5 if the slides were actuated over a radially outwardly directed adjusting path. This formation of an interstice is reliably prevented when there is an adjustment of the clear width of the melt channel 4 to a greater width by the secondary slide segments 5b, 5c, which take up this space, and therefore have in cross section an approximately wedge-shaped main body 8b, 8c. On the end side of the secondary slide segments 5b, 5c that is facing the melt channel 4 and is directly adjacent the melt channel 4, these secondary slide segments have an approximately crescent-shaped profile, which on the one hand seals off the melt channel 4 on the slide side and on the other hand forms a contour approximately in the form of a circular arc, with a variable radius.

For this purpose, the secondary slide segments 5b, 5c lie with a sealing surface 10 that extends transversely to the adjusting direction of the main slide segment 5a against the end side of the main slide segment 11. The sealing off of the melt channel 4 on the slide side takes place here by way of a pressing of surfaces between the sealing surface 10 of the secondary slide segments 5b, 5c and the end side 11 of the main slide segment.

On the side remote from the melt channel 4, the secondary slide segments 5b, 5c are respectively provided with guiding tongues 12, which in the same way as the ram 9 pass through lead-throughs 13 of the die body 3.

It is evident to a person skilled in the art that an adjusting movement of the slide 5 can be brought about overall by introducing force by way of the ram 9 of the main slide segment 5a, but also by introducing force onto the guiding tongues 12 of the secondary slide segments 5b, 5c, as long as the force is distributed uniformly between the secondary slide segments 5b, 5c, so that it is ensured that the arrangement does not become skewed.

An adjusting movement of the main slide segment 5a from the radially inward position represented in FIG. 2 into the radially outward position represented in FIG. 3 has the effect that the secondary slide segments 5b, 5c are taken along. Because of the slotted-link guidance on the main slide segment 5a, this movement is accompanied concurrently by an extending movement of the secondary slide segments 5b, 5c, i.e. a movement of the secondary slide segments 5b, 5c approximately perpendicularly to the direction of the main adjusting movement, so that in the end the radius of the circular arc surface outwardly delimiting the melt channel 4 increases, but the arrangement as a whole remains substantially free from gaps and sealed.

Figure 4:
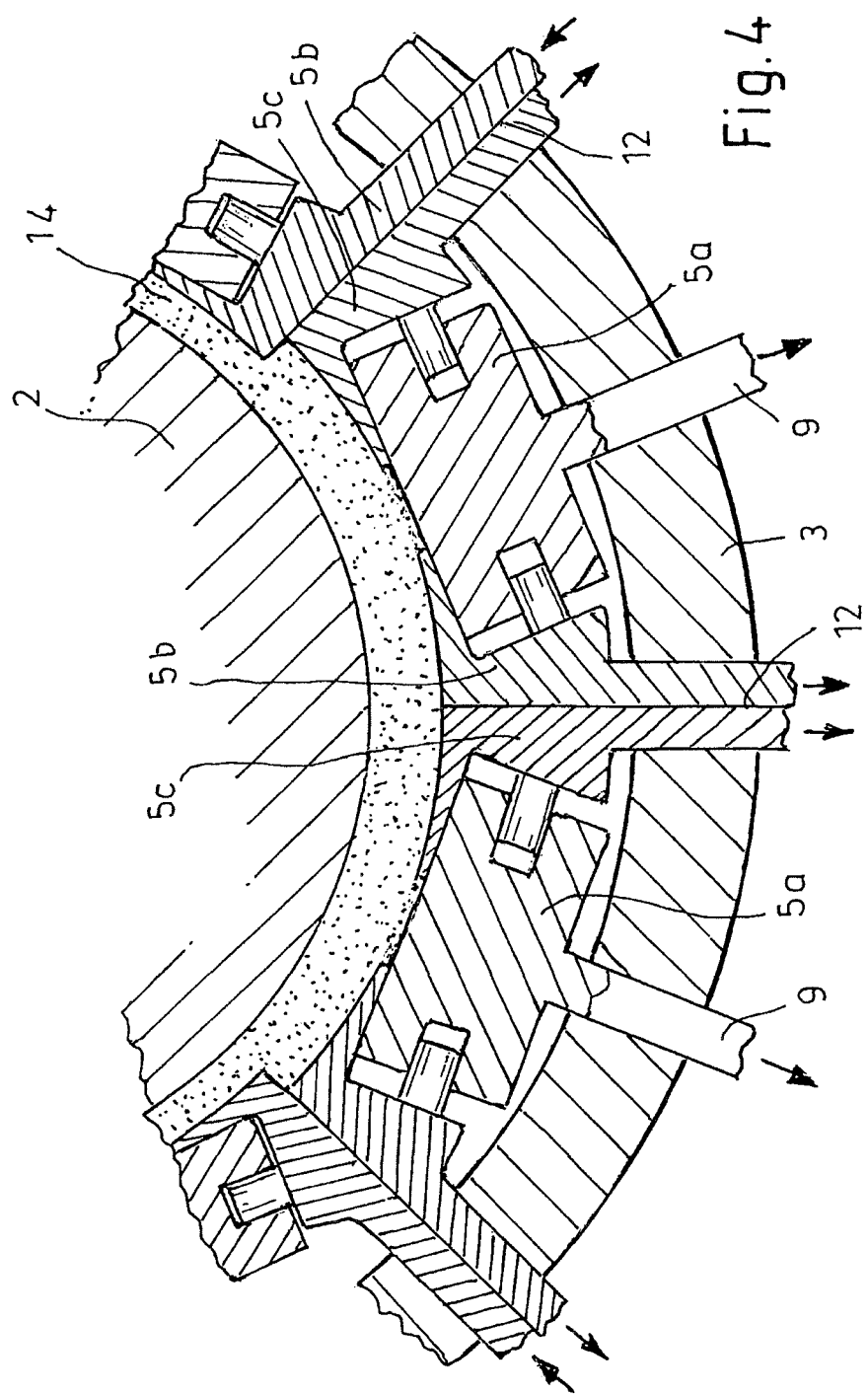

FIG. 3 shows for example an arcuate portion of the melt channel 4 with two completely opened, i.e. radially outwardly adjusted, slides 5, whereas the respectively neighboring slides have been closed. This produces a segmental thickening of the extrudate 14 within the melt channel 4. FIG. 7 shows a cross section through the melt channel 4 that corresponds approximately to the slide position in FIG. 4. FIG. 5 shows the completely narrowed melt channel, FIG. 6 shows the melt channel with a retracted, i.e. radially outwardly moved, slide 5, whereas FIG. 8 shows the melt channel 4 with respectively three opened slides 5.

It is evident that, in the case where the annular die has a full complement of slides, a large number of different profiles of the melt channel can be produced. In addition, the mandrel 2 may be axially adjustable for the purpose of adjusting the basic width of the melt channel 4.

In addition to the cross-sectional region of the die body 3 that is not represented, the secondary slide segments 5b, 5c may be radially guided, for example by grooves and/or tongues provided on the upper side and/or the underside, which engage in corresponding grooves and/or tongues of the die body 3. Guiding may also be accomplished by appropriate dimensioning of the lead-throughs 13.

It is evident to a person skilled in the art that, by means of the slides 5, the melt channel 4 can for example be completely shut off at diametrically opposed points, so that, instead of a tubular extrudate 14, two sheet-like, arcuate extrudates or sheet-like or arcuate preforms can be produced.

As can be seen from the sectional view in FIG. 9 (in a way similar to FIGS. 10 and 11, FIG. 9 only shows part of the circumference of the annular die in the sectional plane concerned), it is provided in the case of an alternative configuration of the annular die 1 according to the invention that the secondary slide segments 5b, 5c respectively have an approximately C-shaped cross-sectional profile and outwardly enclose the main slide segment 5a or the main body 8 thereof, and as a result a mutual guidance of the secondary slide segments 5b, 5c on the main slide segment 5a is likewise ensured.

A further configuration of the annular die 1 according to the invention can be seen in the partial sectional view in FIG. 10. Guiding bores 7 are respectively provided there in the main body 8 of the main slide segment 5a and extend approximately at an angle of 45° to the main adjusting movement of the main slide segment 5a. Correspondingly, the pins 6 of the secondary slide segments 5b, 5c extend at an angle of approximately 45° to the longitudinal extent thereof. The end face of the main bodies 8b, 8c of the secondary slide segments 5b, 5c that are facing the melt channel 4 are partially beveled, likewise by approximately 45°, so that, when there is a retracting movement of the main slide segment 5a, a stepped arc portion of the melt channel 4 is produced.

In the case of the exemplary embodiment according to FIG. 11, the secondary slide segments 5b, 5c are formed in a way substantially corresponding to the secondary slide segments according to the first exemplary embodiment, although entirely without the slotted-link guidance of the secondary slide segments 5b, 5c on the main slide segment 5a. Rather, the arrangement as a whole is kept in the extended position, i.e. in the position widening the melt channel 4, by means of tension springs 15, the melt pressure within the melt channel generally being sufficient to keep all of the slide segments of a slide 5 in the position concerned with the aid of the tension springs 15. Instead of tension springs, other adjusting elements may be provided to keep the slide segments in this position. An actuation for example of the main slide segment 5a may therefore take place inwardly against the melt pressure by a corresponding adjustment setting. In the case of this exemplary embodiment, the secondary slide segments 5b, 5c are guided in the die body 3 and are supported on the end side of the main body 8 of the main slide segment. Guidance of the secondary slide segments 5b, 5c on the main slide segment 5a in the sense of the first exemplary embodiment is not provided.

LIST OF DESIGNATIONS

1 Annular die
2 Mandrel
3 Die body
4 Melt channel
5 Slide
5a Main slide segment
5b, 5c Secondary slide segments
6 Pin
7 Guiding bore
8 Main body of the main slide segment
8b, 8c Main body of the secondary slide segments
9 Ram
10 Sealing surface of the secondary slide segments
11 End side of the main slide segment
12 Guiding tongues
13 Lead-throughs
14 Extrudate
15 Tension spring

What is claimed is:

1. An annular die for extrusion, comprising:
   a mandrel,
   a die body,
   at least one radially adjustable slide,
   a melt channel, the melt channel having a cross-sectional profile and a circumference,
   wherein the cross-sectional profile of the melt channel is variable by the at least one radially adjustable slide,
   wherein the circumference of the melt channel is at least partially defined by the at least one radially adjustable slide,
   wherein the at least one radially adjustable slide is formed by a plurality of segments that are adjustable together from a first position to a second position,
   wherein the plurality of segments in each of the first position and the second position form an arc portion of the melt channel,
   wherein a radius of the arc portion is different according to the first position and the second position of the plurality of segments,
   wherein the plurality of segments of the at least one radially adjustable slide comprise a main slide segment and two secondary slide segments, which together form the arc portion of the melt channel, and
   wherein the two secondary slide segments are guided on the main slide segment at an angle to an adjusting direction of the main slide segment.

2. The annular die as claimed in claim 1, wherein the plurality of segments of the at least one radially adjustable slide are kinematically positively coupled.

3. The annular die as claimed in claim 1, wherein the two secondary slide segments are respectively coupled to the main slide segment by way of a slotted-link guide.

4. The annular die as claimed in claim 1, wherein the two secondary slide segments are guided such that a radial adjustment of the main slide segment with respect to the circumference of the melt channel brings about a radial adjusting movement and a concurrent transverse adjusting movement of the secondary slide segments.

5. The annular die as claimed in claim 1, wherein a plurality of radially adjustable slides define the circumference of the melt channel.

6. The annular die as claimed in claim 1, wherein the mandrel is axially adjustable.

7. The annular die as claimed in claim 1, wherein at least one of the die body and the mandrel are adjustable such that the melt channel is asymmetrically adjustable.

8. The annular die as claimed in claim 1, wherein the cross-sectional profile of the melt channel is dynamically adjustable during extrusion.

9. The annular die as claimed in claim 1, wherein the at least one radially adjustable slide further comprises a plurality of radially adjustable slides.

10. The annular die as claimed in claim 9, wherein the circumference of the melt channel is at least partially defined by the plurality of radially adjustable slides, wherein each radially adjustable slide of the plurality of radially adjustable slides is formed by a plurality of segments that are adjustable together from a first position to a second position, wherein the plurality of segments of each radially adjustable slide in each of the first position and the second position each form an arc portion of the melt channel, wherein a radius of each arc portion is different according to the first position and the second position of the plurality of segments of each radially adjustable slide, wherein the plurality of segments of each radially adjustable slide each comprise a main slide segment and two secondary slide segments, which together form the arc portion of the melt channel, and wherein the two secondary slide segments of each radially adjustable slide are guided on the main slide segment of each radially adjustable slide at an angle to an adjusting direction of the main slide segment of each radially adjustable slide.

11. A method for extrusion, comprising:
extruding an extrudate with an annular die, the annular die comprising
a mandrel,
a die body,
at least one radially adjustable slide,
a melt channel, the melt channel having a cross-sectional profile and a circumference,
wherein the cross-sectional profile of the melt channel is variable by the at least one radially adjustable slide,
wherein the circumference of the melt channel is at least partially defined by the at least one radially adjustable slide,
wherein the at least one radially adjustable slide is formed by a plurality of segments that are adjustable together from a first position to a second position,
wherein the plurality of segments in each of the first position and the second position form an arc portion of the melt channel,
wherein a radius of the arc portion is different according to the first position and the second position of the plurality of segments,
wherein the plurality of segments of the at least one radially adjustable slide comprise a main slide segment and two secondary slide segments, which together form the arc portion of the melt channel, and
wherein the two secondary slide segments are guided on the main slide segment at an angle to an adjusting direction of the main slide segment, and
varying the cross-sectional profile of the melt channel by the at least one radially adjustable slide while extruding the extrudate through the melt channel.

12. The method as claimed in claim 11, further comprising varying a width of a portion of the melt channel by the at least one radially adjustable slide while maintaining a width of another portion of the melt channel.

13. The method as claimed in claim 11, wherein the at least one radially adjustable slide further comprises a plurality of radially adjustable slides, and further comprising varying the cross-sectional profile of the melt channel by the plurality of radially adjustable slides.

14. The method as claimed in claim 13, wherein varying the cross-sectional profile of the melt channel by the at least two radially adjustable slides is performed while extruding an extrudate through the melt channel.

* * * * *